United States Patent [19]

Overby

[11] Patent Number: 4,874,408
[45] Date of Patent: Oct. 17, 1989

[54] LIQUID DRAIN ASSEMBLY

[75] Inventor: Kenneth W. Overby, Hamilton, Ind.

[73] Assignee: La-Man Corporation, Hamilton, Ind.

[21] Appl. No.: 188,638

[22] Filed: May 2, 1988

Related U.S. Application Data

[63] Continuation of Ser. No. 115,416, Nov. 2, 1987, abandoned.

[51] Int. Cl.⁴ .............................................. B01D 19/00
[52] U.S. Cl. ................................... 55/218; 137/205; 55/431; 55/466; 417/155
[58] Field of Search ............... 55/218, 219, 413, 431, 55/423, 432, 466, DIG. 17, DIG. 25; 137/177, 193, 194, 171, 205; 417/155; 141/285

[56] References Cited

U.S. PATENT DOCUMENTS

| | | | |
|---|---|---|---|
| 1,115,505 | 11/1914 | Chapin | 210/406 |
| 1,325,991 | 12/1919 | King | 141/290 |
| 1,443,428 | 1/1923 | Nolen | 137/205 |
| 1,856,685 | 5/1932 | Anderson | 55/413 |
| 2,521,785 | 9/1950 | Goodloe | 55/DIG. 25 |
| 3,093,467 | 6/1963 | McLaughlin | 55/218 |
| 3,402,529 | 9/1968 | Frantz | 55/431 |
| 3,488,927 | 1/1970 | Jepson et al. | 55/431 |
| 3,559,764 | 2/1971 | Wheeler, Jr. | 184/55 |
| 4,385,913 | 5/1983 | Lane | 55/DIG. 17 |
| 4,487,618 | 12/1984 | Mann | 55/DIG. 25 |
| 4,600,416 | 7/1986 | Mann | 55/323 |
| 4,678,488 | 7/1987 | Howard et al. | 55/406 |

FOREIGN PATENT DOCUMENTS 1011989  7/1952  France .............................. 55/413

Primary Examiner—Bernard Nozick
Attorney, Agent, or Firm—Barnes & Thornburg

[57] ABSTRACT

An in-line vapor trap for removing water and/or oil vapor from a compressed air line which includes a manifold having spaced coaxial inlet and outlet openings, a hollow base suspended from the manifold, and replaceable cartridges connecting the manifold inlet to the hollow base and connecting the hollow base to the manifold outlet. A honeycomb structure is disposed in the lower portion of the base within the enclosed volume defined thereby, and cooperates with the base side and bottom walls to define a zone of substantially zero air movement for collection of liquid droplets. A depression in the base bottom wall forms a liquid sump, and a drain opens into the sump for drainage of captured liquid. This drain features an enclosed bowl suspended by a hollow fitting beneath the sump, and an aspiration tube which extends from within the bowl through the fitting and sump to adjacent the exit from the hollow base, such that air is circulated from within the base through the fitting into the bowl and then aspirated therefrom through the tube. Liquid collected in the sump is drawn by such air circulation into the bowl.

40 Claims, 1 Drawing Sheet

TO COLLECTION TANK

U.S. Patent
Oct. 17, 1989
4,874,408
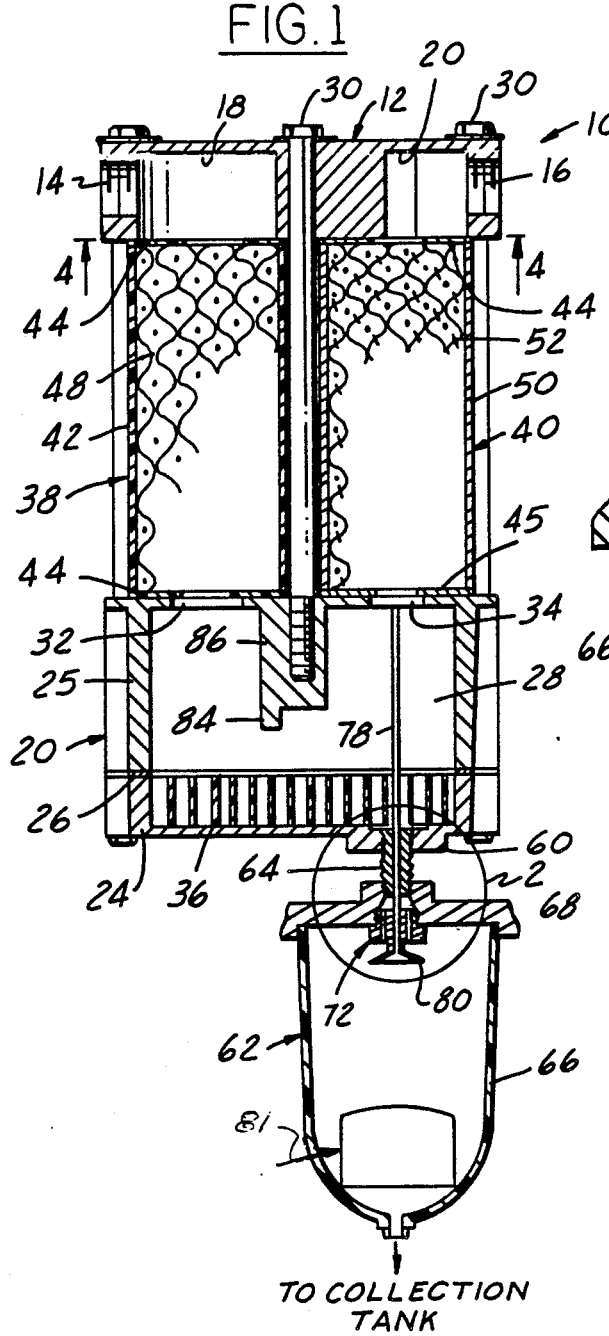
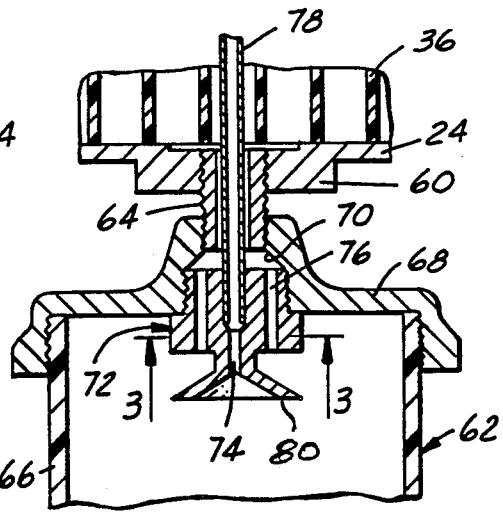
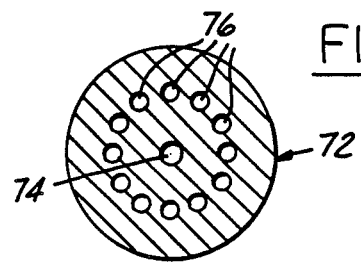
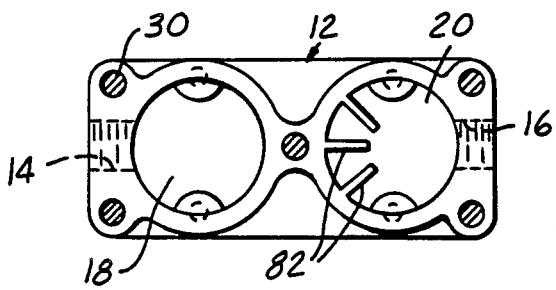
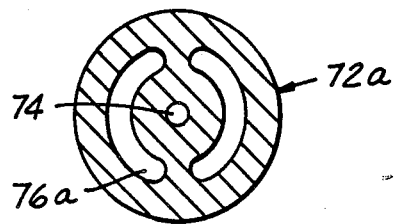

LIQUID DRAIN ASSEMBLY

This is a continuation of co-pending application Ser. No. 115,416 filed on November 2, 1987 now abandoned.

The present invention is directed to devices of a type adapted to remove oil and/or water vapor from a flowing gaseous medium such as compressed air, and more particularly to improved drainage of devices of this character.

U.S. Pat. No. 4,487,618 assigned to the assignee hereof discloses an in-line trap for removing water and/or oil vapor from a compressed air line which includes a manifold having spaced coaxial inlet and outlet openings and a hollow base suspended from the manifold. A first cartridge extends between the manifold inlet and the enclosed volume within the hollow base, and contains a wire pad adapted to coalesce water and/or oil vapor in air passing therethrough into droplets which are then entrained by the air and carried into the base volume. An integral honeycomb structure cooperates with the bottom and side walls of the base to form a dead airspace which captures water droplets falling from air entering the enclosed volume from the first cartridge. A second cartridge, which includes spirally wound fiber and wire mesh materials, directs compressed air from within the enclosed base volume to the manifold outlet and simultaneously functions to remove any remaining vapor therefrom.

In a commercial embodiment of the device disclosed in the referenced patent marketed by applicant's assignee under the trademark EXTRACTOR, a depression in the bottom wall of the base forms a liquid sump for collection of water and/or oil removed from the compressed air. A conventional drain mechanism, including a T-shaped draincock, is mounted in the base wall depression for selectively draining liquid collected therein. U.S. Pat. No. 4,600,416 discloses an improvement upon such commercial device in which the drain features an open annular orifice for continuous weep-drainage of liquid under pressure. The orifice surrounds a wire having an angulated head disposed within the sump. The wire may be rotated by an operator so as to remove dirt and debris from surrounding and clogging the annular weep orifice.

Although the devices hereinabove described have enjoyed substantial commercial acceptance and success, improvements remain desirable. In particular, the continuously-open weep drain causes a significant and undesirable loss of air pressure. Furthermore, liquid ejected from the trap puddles or pools beneath the weep drain, which is often undesirable in a manufacturing environment. It is therefore a general object of the present invention to provide an air line vapor trap of the described character which features an improved drain structure for continuously and automatically draining liquid collected in the trap sump without substantially reducing pressure in the main air line and without spraying the liquid into the surrounding environment.

In accordance with the present invention, an air line vapor trap of the described type is characterized in that a second enclosure is suspended by an open fitting beneath the drain sump, and a hollow tube extends from within the second enclosure through the fitting and sump to the entrance to the second cartridge. Air is thus aspirated through the tube from within the second enclosure so as to draw liquid from the sump through the fitting into the second enclosure. In a preferred embodiment of the present invention, the tube is carried by a collar mounted within the second enclosure beneath the fitting and communicates with a central opening in such collar. An array of drain openings surround the central opening in the collar, and an axially and radially flared skirt surrounds the central opening and is positioned beneath the array of drain openings. Liquid drawn through the drain array into the second enclosure thus impinges upon and drips from the skirt, and is not re-aspirated through the central opening and tube into the trap. A float drain or the like is carried at the lower portion of the second enclosure for periodically draining liquid collected therein to a suitable collection tank or the like.

The invention, together with additional objects, features and advantages thereof, will be best understood from the following description, the appended claims and the accompanying drawing in which:

FIG. 1 is an elevational bisectional view taken in a vertical plane through the vapor trap in accordance with a presently preferred embodiment of the invention;

FIG. 2 is a fragmentary view of the trap in FIG. 1 featuring a portion of the drain mechanism on an enlarged scale;

FIGS. 3 and 4 are sectional views taken substantially along the respective lines 3—3 and 4—4 in FIGS. 2 and 1; and FIG. 5 is a view similar to that of FIG. 3 but illustrating a modified embodiment of the invention.

The disclosures of above-noted U.S. Pat. Nos. 4,487,618 and 4,600,416 are incorporated herein by reference.

FIG. 1 illustrates a presently preferred embodiment 10 of a vapor trap in accordance with the invention as comprising a cap or manifold 12 having oppositely directed and coaxially aligned internally threaded openings 14, 16 respectively defining an inlet and outlet adapted for in-line connection to a gas line such as a compressed air line. A concave internal surface 18 on manifold 12 internally opposed to inlet opening 14 directs inlet air orthogonally of the inlet axis, or downwardly in the orientation of FIG. 1. In the same manner, a concave surface 20 opposed to outlet opening 16 receives and directs upwardly flowing air to outlet opening 16. A hollow base 22 of generally rectangular construction comprises a bottom wall plate 24 and a continuous sidewall 25 peripherally contiguous with bottom wall plate 24 and separated therefrom by the gasket 26. Base 22 thus forms an enclosed volume 28 suspended beneath and fastened to manifold 12 by the bolts 30. A pair of laterally spaced circular openings 32,34 are formed in base 22 in respective alignment in assembly with the inlet and outlet of manifold 12. An integral honeycomb structure 36 is disposed in the lower portion of enclosed volume 28 adjacent to bottom wall plate 24 and cooperates with the side and bottom walls of enclosure 28 to define a zone of substantially zero air movement adjacent to the enclosure bottom wall.

A pair of laterally spaced replaceable vaporizer cartridges 38,40 are clamped by bolts 30 between manifold 12 and base 22 in sealing engagement therewith. Cartridge 38, which is clamped in axial alignment between the inlet section of manifold 12 and opening 32 in base 22, comprises a cylindrical cartridge case 42 and an axially spaced pair of open end gaskets 44 clamped in sealing engagement with manifold 12 and base 22 respectively. Within case 42, cartridge 38 comprises a mass or pad 48 of wire mesh fibers of a type adapted to coalesce water or oil vapor passing therethrough into vapor droplets. Pad 48 in the preferred embodiment of the invention comprises a so-called "Goodloe column packing" of a type disclosed in U.S. Pat. No. 2,521,785. The dimension of cartridge 38 cross-sectional to air flow is substantially less than that of the enclosed volume 28 within base 22. Cartridge 40, which is clamped in axial alignment between the outlet portion of manifold 12 and base opening 34, comprises an outer cylindrical case 50 and a pair of end gaskets 44,45 in respective sealing engagement with manifold 12 and base 22. Within cartridge case 50 and between end gaskets 44,45, and filling the entire cartridge volume, is a plug structure 52 of absorbent fabric interwoven with strengthening wire threads.

In operation of trap 10, which is similar in most important respects to that disclosed in U.S. Pat. No. 4,487,618 to the extent thus far described, air with entrained water and/or oil vapor is received through inlet opening 14 and directed by surface 18 downwardly into and through cartridge pad 48. During such passage through pad 48, the water and/or oil vapors are coalesced into droplets which are entrained in the flowing air mass and carried thereby into the open volume 28 within base 22. Since the cross-sectional dimension to air flow within volume 28 is greater than that within cartridge 38, the velocity of air entering the open base is reduced, and the entrained droplets fall by gravity and centrifugal force toward the lower portion of the base. Such droplets are captured within the essentially dead airspace formed by honeycomb structure 36. Since the construction of honeycomb structure 36 prevents substantial air movement therewithin, revaporization is substantially eliminated. In the meantime, the compressed air stream, which is now 75% to 95% dry, is fed from enclosed volume 28 through opening 34 into cartridge 40. As the air passes upwardly through the fiber/mesh plug 52 toward outlet 16, any remaining vapor is removed by the fibrous plug material. A depression 60 is formed in bottom wall plate 24, beneath honeycomb structure 36 and the dead air space provided thereby, to serve as a sump for liquid removed from the compressed air stream.

In accordance with the present invention, sump 60 is positioned beneath opening 34 coaxially therewith. An enclosure 62 is suspended from sump 60 by the hollow fitting 64 which is threadably received into a corresponding opening in sump 60. Enclosure 62 comprises a bowl 66 having an open edge suspended from the periphery of an enclosure top 68. Top 68 has a central opening 70 into which the lower end fitting 64 is threadably received. Opening 70 is outwardly and downwardly flared, as best seen in FIG. 2, and has a collar 72 threadably received therein from within enclosure 62 coaxially with fitting 64. Collar 72 has a circular central passage 74, and has a circumferential array of passages 76 extending axially therethrough surrounding central passage 74. A rigid tube 78 is press-fitted into a counterbore in central passage 74 and extends upwardly through opening 70, fitting 64, sump 60 and honeycomb 36 to terminate at opening 34 (FIG. 1) coaxially therewith. A conical skirt 80 integrally depends from collar 72 surrounding central opening 74 and flares axially and radially therefrom beneath passages 76.

In operation, air flowing from within enclosed volume 28 through opening 34 to cartridge 40 exhibits increase in velocity due to decrease in effective cross-sectional area. In this respect, it will be noted in FIG. 1 that the air-passage opening 34 and the central opening in gasket 45 are smaller than opening 32 and the corresponding passage in gaskets 44 in order to enhance such velocity increase. Air is aspirated upwardly through tube 78 and central passage 74, which thus draws a small amount of air from within volume 28 through fitting 64 surrounding tube 78 and through openings 76 into enclosure 62. Such air flow through fitting 64 draws liquid from sump 60 through opening 70 and through openings 76 in collar 72. Such liquid impinges upon and drips from skirt 80, which thus prevents flow of liquid along collar 72 and re-aspiration through tube 78. A float drain or other conventional device 81 is positioned at the lower end of bowl 66 for periodically draining liquid therefrom into a suitable collection tank or the like (not shown).

FIG. 5 illustrates a modified collar 72a wherein the multiplicity of circular opening 76 in the embodiment of FIG. 3 are replaced by a pair of kidney-shaped openings 76a extending at constant radius around central opening 74. FIG. 4 illustrates an improvement in manifold 12 whereby ribs 82 extend from surface 20 and thus help support gasket 44 against pressure surges in air passing through the vapor trap. FIG. 1 also illustrates a further improvement in the prior art traps hereinabove described whereby a baffle 84 projects downwardly from the central boss 86 within enclosed volume 28 for promoting downward circulation of air toward honeycomb 36.

The invention claimed is:

1. A liquid drain assembly comprising
a liquid collection basin configured to receive a flow of compressed air and formed to include a sump, the liquid collection basin being formed to include aspirator means for temporarily accelerating a flow of compressed air in the liquid collection basin to produce a region of negative pressure in a throat passage defined by the aspirator means, the liquid collection basin also being formed to include means for passing the flow of compressed air received therein through the throat passage,
enclosure means for defining an enclosed volume configured to collect liquid drained from the sump,
means for conducting liquid from the sump formed in the liquid collection basin into the enclosed volume, the conducting means interconnecting the liquid collection basin and the enclosure means, and
means for drawing liquid into the enclosed volume through the conducting means in response to development of negative pressure in the throat passage of the aspirator means, the drawing means including an aspirator tube having an inlet opening and an outlet opening, the aspirator tube extending through the conducting means to position its inlet opening in the enclosed volume and its outlet opening above the crest of liquid in the sump, the aspirator tube being connected to the aspirator means to position the outlet opening of the aspirator tube in the throat passage so that air present in the enclosed volume is drawn into the aspirator tube in response to development of negative pressure in the throat passage to develop sufficient negative pressure in the enclosed volume to draw liquid collected in the sump into the enclosed volume through the conducting means.

2. The assembly of claim 1, wherein the liquid collection basin includes a top wall, a bottom wall, and a side wall extending therebetween to define an interior region of the liquid collection basin and the top wall is formed to include an outlet opening defining the throat passage of the aspirator means.

3. The assembly of claim 2, wherein the top wall is also formed to include an inlet opening to admit compressed air into the interior region of the liquid collection basin and the cross-sectional diameter of the outlet opening is smaller than the cross-sectional diameter of the inlet opening to enhance acceleration of a flow of compressed air in the throat passage.

4. The assembly of claim 1, further comprising means for selectively draining liquid collected in the enclosed volume.

5. The assembly of claim 1, wherein the conducting means includes fitting means for suspending the enclosure means from the liquid collection basin, the fitting means being formed to include a central liquid-conducting passage therethrough.

6. The assembly of claim 5, wherein the aspirator tube extends through the liquid-conducting passage to interconnect the enclosed volume and the sump.

7. The assembly of claim 5, wherein the means for defining an enclosed volume includes a top having a central opening received on and coupled to the fitting means, and further comprising a collar received in said opening within the enclosed volume, the collar being formed to include a central passage defining a portion of the drawing means.

8. The assembly of claim 7, wherein the collar is further formed to include at least one liquid-conducting passage radially offset from said central passage.

9. The assembly of claim 8, wherein said at least one liquid-conducting passage comprises a plurality of kidney-shaped passages at constant radius from said central passage.

10. The assembly of claim 8, wherein said at least one liquid-conducting passage comprises an array of passages surrounding said central liquid-conducting passage.

11. The assembly passage of claim 10, further comprising a radially and axially flared skirt surrounding said central liquid-conducting passage and positioned beneath said array of passages.

12. The assembly of claim 1, wherein the enclosure means is formed to include an opening, the conducting means includes means positioned in the opening for admitting liquid collected in the sump into the enclosed volume, and the admitting means is formed to include a portion of the drawing means.

13. The assembly of claim 12, wherein the admitting means includes a hollow fitting formed to include an inner wall defining a liquid-conducting passage extending therethrough and a collar formed to include a central passage and at least one liquid-conducting passage radially offset from said central passage.

14. The assembly of claim 13, wherein the aspirator tube extends through the liquid-conducting passage in the hollow fitting and cooperates with the inner wall in the hollow fitting to define a space therebetween for conducting liquid traveling from the sump into the enclosed volume through the hollow fitting without intermixing with air in the aspirator tube.

15. The assembly of claim 13, wherein one end of the aspirator tube terminates in the central passage formed in the collar.

16. A liquid drain assembly comprising a liquid collection basin configured to receive a flow of compressed air and formed to include a sump, the liquid collection basin being formed to define aspirator means for temporarily accelerating a flow of compressed air in the liquid collection basin to produce a region of negative pressure in a throat passage defined by the aspirator means, the liquid collection basin also being formed to include means for passing the flow of compressed air received therein through the throat passage, vessel means for containing liquid drained from the sump, the vessel means being formed to include an open mouth and an enclosed volume in communication with the open mouth, and closure means for closing the open mouth, the closure means being formed to include first passageway means for conducting liquid from the sump into the enclosed volume, the first passageway means interconnecting the liquid collection basin and the vessel means, and second passageway means for using negative pressure developed in the throat passage to develop sufficient negative pressure in the enclosed volume to draw liquid collected in the sump into the enclosed volume through the first passageway means, the second passageway means interconnecting the enclosed volume and the aspirator means.

17. The assembly of claim 16, wherein the liquid collection basin includes a top wall, a bottom wall, and a side wall extending therebetween to define an interior region of the liquid collection basin and the top wall is formed to include an outlet opening defining the throat passage of the aspirator means.

18. The assembly of claim 17, wherein the top wall is also formed to include an inlet opening to admit compressed air into the interior region of the liquid collection basin and the cross-sectional diameter of the outlet opening is smaller than the cross-sectional diameter of the inlet opening to enhance acceleration of a flow of compressed air in the throat passage.

19. The assembly of claim 16, wherein the closure means includes a radially and axially flared skirt surrounding an opening of the second passageway means and positioned beneath an opening of the first passageway means.

20. The assembly of claim 16, further comprising means for selectively draining liquid collected in the enclosed volume of the vessel means.

21. The assembly of claim 16, wherein the closure means includes a hollow fitting having an inner wall defining a central passage and an aspirator tube extending through the central passage to define a portion of the first passageway means between the inner wall and the aspirator tube, and the aspirator tube is configured to define a portion of the second passageway means therein.

22. The assembly of claim 16, wherein the closure means includes a collar formed to include a central passage defining a portion of the second passageway means and at least one liquid-conducting passage radially offset from said central passage to define a portion of the first passageway means.

23. The assembly of claim 22, wherein the closure means includes a radially and axially flared skirt integrally attached to the collar, and the skirt is positioned to surround an opening of the central passage and positioned to lie beneath an opening of the at least one liquid-conducting passage.

24. An assembly for draining liquid from an air treatment unit including means for directing a flow of compressed air, the assembly comprising means for collecting liquid in a sump basin, the sump basin including aspirator means for temporarily accelerating the flow of compressed air in the directing means to produce a region of negative pressure in a throat passage defined by the venturi means, the directing means being formed to include means for passing the flow of compressed air received therein through the throat passage, enclosure means for defining an enclosed volume, aspirator tube means for using the negative pressure in the throat passage of the aspirator means to develop negative pressure in the enclosed volume, the aspirator tube means interconnecting the enclosure means and the aspirator means, and means for conducting liquid collected in the sump basin into the enclosed volume in response to suction generated by negative pressure developed in the enclosed volume, the conducting means interconnecting the collecting means and the enclosure means.

25. The assembly of claim 24, wherein the collecting means includes a top wall, a bottom wall, and a side wall extending therebetween to define an interior region of the collecting means and the top wall is formed to include an outlet opening defining the throat passage of the aspirator means.

26. The assembly of claim 25, wherein the top wall is also formed to include an inlet opening to admit compressed air into the interior region of the collecting means and the cross-sectional diameter of the outlet opening is smaller than the cross-sectional diameter of the inlet opening to enhance acceleration of a flow of compressed air in the throat passage.

27. The assembly of claim 24, wherein the enclosure means includes a hollow vessel formed to include an open mouth and the conducting means extends into the open mouth to interconnect the sump and the enclosed volume in fluid communication.

28. The assembly of claim 24, wherein the aspirator tube means includes an aspirator tube having an open mouth at one of its ends communicating with the flow of compressed air in the directing means and an open mouth at the other of its ends communicating with the enclosed volume.

29. In a trap for removing vapor from a compressed air line or the like, the trap including filter means for promoting coalescence of vapor in compressed air conducted through the trap into droplets and first enclosure means for defining a first enclosed volume in communication with the filter means situated to receive droplets generated by the filter means, the improvement comprising apsirator means in the first enclosure means for temporarily accelerating the flow of compressed air discharged from the filter means to produce a region of negative pressure in a throat passage defined by the aspirator means, means in the trap for passing the flow of compressed air received in the trap through the throat passage, and drain means positioned in a lower portion of said first enclosed volume for draining droplets collected therein, the drain means being formed to include an open drain port within the first enclosed volume, the drain means including second enclosure means for defining a second enclosed volume, means for connecting the second enclosed volume to the first enclosed volume at the drain port, and aspirator tube means for using negative pressure in the throat passage to develop sufficient negative pressure in the enclosed volume to draw liquid collected at the lower portion of the first enclosed volume into the second enclosed volume through the connecting means, the aspirator tube means connected to the aspirator means and positioned to extend from the second enclosed volume into the first enclosed volume.

30. The improvement of claim 29, wherein the aspirator tube means includes an elongated hollow tube having a first open end positioned in the throat passage of the first enclosed volume where air passing therethrough is at a predetermined high velocity and negative pressure.

31. The improvement of claim 29, wherein the first enclosure means includes inlet means defining an inlet opening for admitting a flow of air into the first enclosed volume and outlet means defining an outlet opening for discharging the flow of air from the first enclosed volume, and the effective cross-sectional area of the inlet opening is less than the effective cross-sectional area of the outlet opening to define means for increasing the velocity of air passing through the first enclosure means.

32. The improvement of claim 31, wherein the aspirator means includes an elongated hollow tube having a first open end positioned in the first enclosed volume in close proximity and confronting relation to the inlet opening defined by the inlet means.

33. The improvement of claim 29, wherein the connecting means is formed to include at least one opening in the second enclosed volume, the aspirator tube means is formed to include a central opening in the second enclosed volume, and further comprising skirt means disposed underneath the at least one opening and surrounding the central opening for conducting liquid dispensed into the second enclosed volume through the connecting means away from the central opening of the aspirator tube means to minimize flow of liquid from the second enclosed volume into the first enclosed volume via the aspirator tube means.

34. The improvement of claim 29, wherein the connecting means includes fitting means for suspending the second enclosure means from the first enclosure means, the fitting means being formed to include a central liquid-conducting passage therethrough.

35. The improvement of claim 34, wherein the aspirator tube means includes an aspirator tube extending through the central liquid-conducting passage therethrough, the aspirator tube has an upper open end positioned in the first enclosed volume away from liquid collecting in the lower portion thereof and a lower open end in communication with the second enclosed volume.

36. The improvement of claim 29, wherein the second enclosure means includes a top having a central opening coupled to the connecting means, and further comprising a collar received in the central top opening within the second enclosed volume, the collar being formed to include a central passage defining a portion of the aspirator tube means.

37. The improvement of claim 36, wherein the collar is further formed to include at least one liquid-conducting passage radially offset from the central passage.

38. The improvement of claim 37, wherein the at least one liquid-conducting passages comprises a plurality of kidney-shaped passages at constant radius from the central passage.

39. The improvement of claim 37, wherein the at least one liquid-conducting passage comprises an array of passages surrounding the central passage.

40. The improvement of claim 39, further comprising a radially and axially flared skirt surrounding the opening of the central passage and positioned beneath the openings defined by the array of passages.

* * * * *